Aug. 18, 1964        G. M. YAZIGI        3,145,322
AUTOMATIC HEADLIGHT SHUT-OFF AND WARNING SYSTEM
Filed May 21, 1963
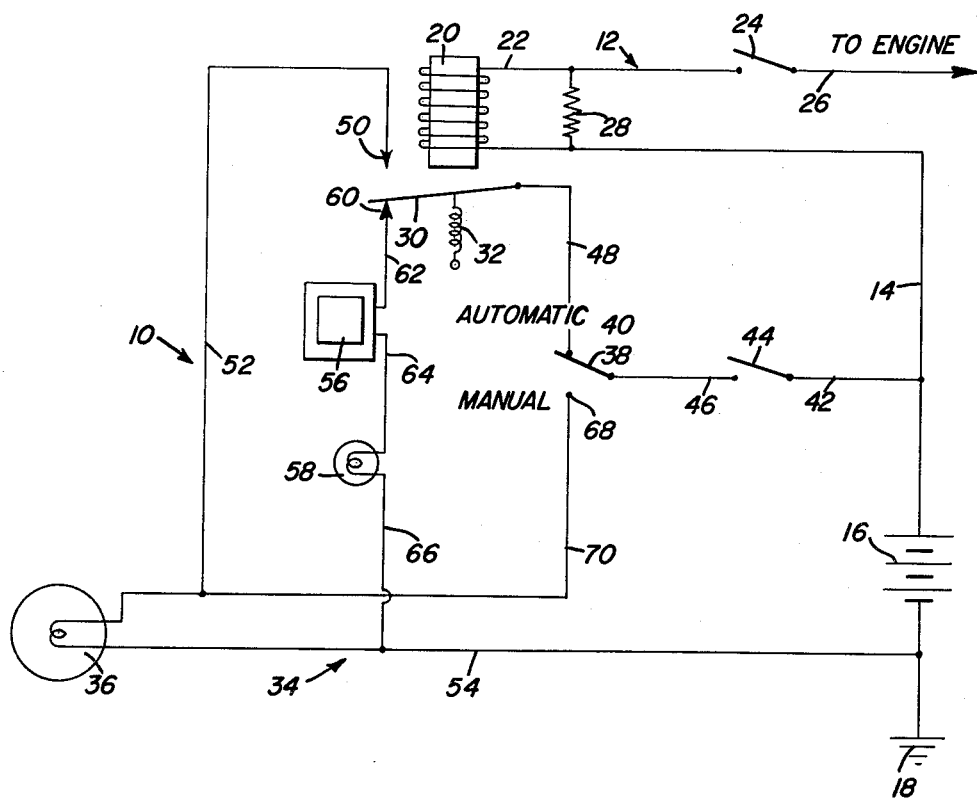
George M. Yazigi
INVENTOR.

3,145,322
AUTOMATIC HEADLIGHT SHUT-OFF AND
WARNING SYSTEM
George M. Yazigi, 2060 Sutterville Road,
Sacramento 22, Calif.
Filed May 21, 1963, Ser. No. 281,897
2 Claims. (Cl. 315—82)

This invention primarily relates to a novel electric circuit for use in conjunction with the ignition system of an automobile.

Every driver has experienced at one time or another, the exasperating tribulation of returning to his automobile only to find that it won't start because the battery has been drained. In the majority of situations, this is due to the inadvertence or neglect of the driver in not turning off his headlights on parking the automobile. Heretofore, electrical systems have been devised for use with the ignition system of the automobile for indicating to the driver when he shuts off his ignition switch that his headlights have been left on. This takes the form of some alarm being sounded to indicate that the aforementioned condition exists. However, the driver must still manually turn his headlights off to stop the alarm. This invention seeks to make the whole operation completely automatic inasmuch as the circuit which will be disclosed herein will not only automatically compensate for the shortcomings of the driver who forgets to turn his headlights off, by actuating a suitable alarm, but will also automatically turn the headlights off as well when the ignition switch of the automobile is opened.

It is accordingly the primary object of this invention to disclose a novel electrical circuit which may be connected to the ignition system of an automobile for indicating to the driver that his headlights have not been turned off when the ignition switch of the vehicle is opened and to also turn off the vehicle lights automatically.

Another object of this invention resides in the fact that a second circuit is provided for use with the circuit already described which may be used to disconnect the alarm system from the first mentioned circuit and to provide a manual control for turning the headlights on or off independent of the actuation of the ignition switch.

A still further object of this invention resides in the ready adaptation of the circuit to existing ignition systems used in conventional automobiles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The single figure presented illustrates a schematic diagram of the circuit comprising the subject matter of the instant invention.

Referring to the drawing in detail, it will be seen that the circuit 10 comprises an ignition starting circuit 12 for an automobile engine. This circuit includes a conductor such as 14 connected to the vehicle battery 16 which is suitably grounded such as illustrated at 18. The conductor 14 is connected to one side of a suitable relay coil 20. A suitable conductor 22 is connected to the other side of the relay coil 20 and is connected at its end remote from the coil 20 to the ignition switch 24 of the vehicle. As illustrated, the ignition switch 24 is adapted to connect the battery 16 to the starting motor and other components of the ignition system by a suitable conductor such as shown at 26. A limiting resistor 28 is placed in parallel with the coil 20 for controlling the current through the coil and preventing it from burning out due to an overload condition. Upon closing of the ignition switch 24, the relay coil 20 is adapted to be actuated and attract an armature switch blade 30 against the force of a coil spring 32 which normally urges the switch blade 30 to the position as shown in the drawings.

The headlight and alarm portion of the circuit is generally designated by the numeral 34 and comprises an automatic and manual circuit for controlling the actuation of the headlights diagrammatically shown at the numeral 36. With the switch 38 in contact with the contact point 40, the circuit is rendered automatic for shutting off the headlights 36 when the ignition switch 24 is open. This circuit can be traced from a conductor 42 connected to the positive terminal of the battery 16 at one end and connected to the headlight switch 44 at its other end, through a conductor 46 connected to one end of the switch 38, through the switch 38 and point contact 40, through a suitable conductor 48, switch blade 30 through point contact 50, to which the switch blade 30 has been attracted by means of the actuation of the coil 20 upon closing of the ignition switch 24, through a conductor 52, to the headlights 36 and through a conductor 54 to the negative terminal of the battery 16. However, if the ignition switch 24 is opened and the headlight switch 44 remains closed, the headlights 36 will be turned off and a suitable alarm 56 and a flashing light 58 which may be mounted upon the instrument panel of the automobile will be actuated. This is due to the fact that when the ignition switch 24 is opened, the spring 32 will retract the switch blade 30 to make contact with a point contact 60. This circuit can be traced from the positive terminal of the battery 16 through the conductor 42, closed headlight switch 44, conductor 46, switch 38, point contact 40, conductor 48, switch blade 30, point contact 60, conductor 62 connected to one side of the alarm 56, conductor 64 connected to the other side of the alarm and to one side of the blinking light 58, conductor 66 connected to the other side of the blinking light and to the conductor 54 and through the conductor 54 to the negative side of the battery 16. It should be understood that by deactuation of the relay coil 20, and withdrawal of the switch blade 30 by means of the spring 32 from the contact point 50, the headlight 36 has been disconnected from the circuit and the alarm 56 and flashing light 58 have been actuated. The alarm 56 and the blinking light 58 warn the driver that the headlight switch 44 is still on.

If desired, the switch 38 may be moved to make contact with a point contact 68 for connecting the headlights 36 to the battery through a circuit which is independent from the ignition circuit 24. This circuit can be traced from the positive terminal of the battery 16 through the conductor 42, the closed headlight switch 44, conductor 46, switch 38, point contact 68, a conductor 70 to one side of the headlight 36, and back through the conductor 54 attached to the other side of the headlight 36 to the negative terminal of the battery 16. Therefore, by merely opening and closing the headlight switch 44, with the switch 38 positioned on the contact 68, the headlights 36 may be actuated and deactuated independent of the opening or closing of the ignition switch 24. Therefore, with the engine turned off, it is still possible to turn your headlights on or off by merely repositioning the switch 38. It should also be apparent that the alarm may be turned off and the headlights kept on by positioning the switch 38 on the point contact 68 after the ignition switch 24 is opened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use as an alarm system in a vehicle equipped with at least one headlight, an electric circuit including a headlight switch, a battery and an ignition switch, means connected in series with said battery and ignition switch for connecting the headlight and headlight switch in series with the battery upon closing of the ignition switch, alarm means, said first named means simultaneously disconnecting the headlight from the battery and connecting the alarm means in series with the battery through the headlight switch when said ignition switch is opened and said headlight switch is closed, said circuit including manually operable switch means for simultaneously disconnecting said alarm means from the battery and connecting the headlight thereto when the headlight switch is closed independent of the position of said ignition switch.

2. The structure of claim 1 wherein said first named means includes a relay adapted to be actuated by the closing of said ignition switch, said relay having a spring-biased armature normally connecting the alarm means to the battery when said headlight switch is closed, actuation of said relay by closing said ignition switch breaking the alarm connection and connecting the headlight to the battery.

References Cited in the file of this patent

UNITED STATES PATENTS

| | | |
|---|---|---|
| 2,820,215 | Hughes | Jan. 14, 1958 |
| 3,072,884 | Hughes | Jan. 8, 1963 |